US 8,842,886 B2

(12) United States Patent
Glasser (10) Patent No.: US 8,842,886 B2
(45) Date of Patent: Sep. 23, 2014

(54) ADAPTIVE TUNING OF BIOMETRIC ENGINES

(76) Inventor: Avery Glasser, Madrid (ES)

( * ) Notice: Subject to any disclaimer, the term of this patent is extended or adjusted under 35 U.S.C. 154(b) by 1127 days.

(21) Appl. No.: 12/450,135

(22) PCT Filed: Aug. 14, 2007

(86) PCT No.: PCT/US2007/075939
§ 371 (c)(1),
(2), (4) Date: Sep. 10, 2009

(87) PCT Pub. No.: WO2008/022157
PCT Pub. Date: Feb. 21, 2008

(65) Prior Publication Data
US 2010/0121644 A1    May 13, 2010

Related U.S. Application Data (60) Provisional application No. 60/837,973, filed on Aug. 15, 2006.

(51) Int. Cl.
G06K 9/00     (2006.01)
G10L 17/04    (2013.01)

(52) U.S. Cl.
CPC ............ G06K 9/00885 (2013.01); G10L 17/04 (2013.01)
USPC ........................................ 382/115; 340/5.84

(58) Field of Classification Search
CPC .................................................... G10L 17/04
USPC ............ 382/115; 340/5.84; 700/37; 704/246, 704/255

See application file for complete search history.

(56) References Cited

U.S. PATENT DOCUMENTS

| 5,737,489 | A  | * | 4/1998  | Chou et al. ..................... 704/256 |
| 7,231,350 | B2 | * | 6/2007  | Gable et al. .................... 704/250 |
| 8,095,193 | B2 | * | 1/2012  | Ridder et al. .................. 600/310 |
| 2004/0236573 | A1 | * | 11/2004 | Sapeluk ......................... 704/224 |
| 2006/0222210 | A1 | * | 10/2006 | Sundaram ...................... 382/115 |

OTHER PUBLICATIONS

Tikkanen et al., Capabilities of Biometrics for Authentication in Wireless Devices, Jun. 9-11, 2003, Proceedings of the 4th International Conference of Audio- and Video-Based Biometric Person Authentication: Lecture Notes in Computer Science [online], vol. 2688, pp. 796-804.*

* cited by examiner

Primary Examiner — Matthew Bella
Assistant Examiner — Dennis Rosario
(74) Attorney, Agent, or Firm — Galvin Patent Law LLC; Brian R. Galvin

(57) ABSTRACT

A method for adaptively tuning a biometric engine comprises the step of generating a database having a plurality of enrollments. Each enrollment corresponds to one or more of a plurality of operation characteristics. The method further comprises the step of comparing, with the biometric engine, enrollments from the database to generate test results including, for each of a plurality of sets of operation characteristics, error rates for a plurality of sensitivity settings and/or confidence score threshold values. The method further comprises the step of analyzing the test results to determine optimized sensitivity settings and/or confidence score threshold values for each set of operation characteristics.

7 Claims, 3 Drawing Sheets

FIG. 3

ADAPTIVE TUNING OF BIOMETRIC ENGINES

CROSS-REFERENCE TO RELATED APPLICATION

The present application claims the benefit of priority from U.S. Provisional Patent Application Ser. No. 60/837,973 entitled "ADAPTIVE TUNING OF BIOMETRIC ENGINES," filed on Aug. 15, 2006, the disclosure of which is hereby incorporated by reference in its entirety for all purposes.

FIELD OF THE INVENTION

The present invention generally relates to biometric authentication and, more specifically, relates to adaptive tuning of biometric engines for improved biometric authentication.

BACKGROUND OF THE INVENTION

Voice biometric engines work by recording an "utterance" spoken by a user and creating a voiceprint, known in the industry as a "template." This act of collecting an utterance and creating a template is called a user "enrollment." To subsequently authenticate a user, another utterance is recorded and compared to the template. This act of comparing an utterance to a template is called a "verification" or "authentication."

The method used to create a template differs among various biometric engines. Commercial voice biometric engines fall, however, into two general categories: text-dependent and text-independent. With text-dependent engines, utterances may be less than a second in length, but a user must repeat the exact words required by the engine for authentication. With text-independent engines, however, enrollment requires upwards of 30 seconds of audio, but thereafter the user can say anything to be authenticated.

SUMMARY OF THE INVENTION

In accordance with certain embodiments of the subject technology, a biometric engine is adaptively tuned to provide authentication for a particular set of operation characteristics ("OC") with optimized error rates. A database of enrollments is populated with actual or simulated enrollments for a plurality of users in a plurality of OC. The biometric engine is tested by comparing various enrollments from the database to generate test results at a variety of sensitivity settings and/or confidence score threshold values for different sets of OC. The test results are analyzed to provide optimized sensitivity settings and/or confidence score threshold values for a given set of OC. During authentication, the security application determines the OC of the authentication session and the OC of the enrollment against which the authentication session is to be compared, and applies the optimized settings previously determined in the analysis of the biometric engine test results.

According to one embodiment of the present invention, a method for adaptively tuning a biometric engine comprises the step of generating a database having a plurality of enrollments. Each enrollment corresponds to one or more of a plurality of operation characteristics. The method further comprises the step of comparing, with the biometric engine, enrollments from the database to generate test results including, for each of a plurality of sets of operation characteristics, error rates for a plurality of sensitivity settings and/or confidence score threshold values. The method further comprises the step of analyzing the test results to determine optimized sensitivity settings and/or confidence score threshold values for each set of operation characteristics.

According to another embodiment of the present invention, a method for biometric authentication comprises the steps of determining a set of operation characteristics corresponding to an authentication session and a corresponding enrollment session, selecting, from a database of sensitivity settings and/or confidence score threshold values, optimized sensitivity settings and/or confidence score threshold values corresponding to the determined set of operation characteristics, and applying the optimized sensitivity settings and/or confidence score threshold values to a comparison of an utterance of the authentication session to an utterance of the corresponding enrollment session.

According to another embodiment of the present invention, a machine-readable medium carries one or more sequences of instructions for adaptively tuning a biometric engine. Execution of the one or more sequences of instructions by one or more processors causes the one or more processors to perform the step of generating a database having a plurality of enrollments. Each enrollment corresponds to one or more of a plurality of operation characteristics. Execution of the one or more sequences of instructions by one or more processors causes the one or more processors to further perform the steps of comparing, with the biometric engine, enrollments from the database to generate test results including, for each of a plurality of sets of operation characteristics, error rates for a plurality of sensitivity settings and/or confidence score threshold values, and analyzing the test results to determine optimized sensitivity settings and/or confidence score threshold values for each set of operation characteristics.

According to another embodiment of the present invention, a method for adaptively tuning one or more biometric engines is provided. The method includes the step of using the one or more biometric engines to compare entries from a database of actual or simulated enrollments to generate test results. Each of the enrollments in the database corresponds to one or more of a plurality of operation characteristics. The test results include, for each set of operation characteristics, error rates for a plurality of sensitivity settings and/or confidence score threshold values. The method further includes the step of analyzing the test results to determine optimized sensitivity settings and/or confidence score threshold values for each set of operation characteristics.

According to another embodiment of the present invention, a method for adaptively tuning one or more biometric engines is provided. The method includes the step of generating a database having a plurality of actual and/or simulated enrollments, each enrollment corresponding to one or more of a plurality of operation characteristics. The method further includes the step of using the one or more biometric engines to compare entries from the database to generate test results including, for each set of operation characteristics, error rates for a plurality of sensitivity settings and/or confidence score threshold values. The method further includes the step of analyzing the test results to determine optimized sensitivity settings and/or confidence score threshold values for each set of operation characteristics.

According to yet another embodiment of the present invention, a method for biometric authentication using one or more adaptively tuned biometric engines is provided. The method includes the step of using the one or more biometric engines to compare entries from a database of actual or simulated enrollments to generate test results. Each of the enrollments in the database corresponds to one or more of a plurality of operation characteristics. The test results include, for each set of operation characteristics, error rates for a plurality of sensitivity settings and/or confidence score threshold values. The method further includes the step of analyzing the test results to determine optimized sensitivity settings and/or confidence score threshold values for each set of operation characteristics. The method further includes the steps of determining one or more operation characteristics of an authentication session and a corresponding enrollment to determine an applicable set of operation characteristics, selecting optimized sensitivity settings and/or confidence score threshold values for the applicable set of operation characteristics, and applying the selected optimized sensitivity settings and/or confidence score threshold values to the authentication session.

According to yet another embodiment of the present invention, a method for biometric authentication using one or more adaptively tuned biometric engines is provided. The method includes the step of generating a database having a plurality of actual and/or simulated enrollments, each enrollment corresponding to one or more of a plurality of operation characteristics. The method further includes the step of using the one or more biometric engines to compare entries from the database to generate test results including, for each set of operation characteristics, error rates for a plurality of sensitivity settings and/or confidence score threshold values. The method further includes the step of analyzing the test results to determine optimized sensitivity settings and/or confidence score threshold values for each set of operation characteristics. The method further includes the steps of determining one or more operation characteristics of an authentication session and a corresponding enrollment to determine an applicable set of operation characteristics, selecting optimized sensitivity settings and/or confidence score threshold values for the applicable set of operation characteristics, and applying the selected optimized sensitivity settings and/or confidence score threshold values to the authentication session.

According to yet another embodiment of the present invention, a method for biometric authentication is provided. The method includes the steps of (1) determining a set of operation characteristics corresponding to an authentication session and a corresponding enrollment session and (2) selecting, from a database of sensitivity settings and/or confidence score threshold values, optimized sensitivity settings and/or confidence score threshold values corresponding to the set of operation characteristics.

According to yet another embodiment of the present invention, a method for biometric authentication is provided. The method includes the steps of (1) determining a set of operation characteristics corresponding to an authentication session and a corresponding enrollment session and (2) selecting, from a database of sensitivity settings and/or confidence score threshold values, optimized sensitivity settings and/or confidence score threshold values corresponding to the set of operation characteristics. The method further includes the step of (3) applying the optimized sensitivity settings and/or confidence score threshold values to a comparison of an utterance of the authentication session to an utterance of the corresponding enrollment session.

It is to be understood that both the foregoing summary of the invention and the following detailed description are exemplary and explanatory and are intended to provide further explanation of the invention as claimed.

BRIEF DESCRIPTION OF THE DRAWINGS

The accompanying drawings, which are included to provide further understanding of the invention and are incorporated in and constitute a part of this specification, illustrate embodiments of the invention and together with the description serve to explain the principles of the invention. In the drawings.

DETAILED DESCRIPTION OF THE INVENTION

In the following detailed description, numerous specific details are set forth to provide a full understanding of the present invention. It will be apparent, however, to one ordinarily skilled in the art that the present invention may be practiced without some of these specific details. In other instances, well-known structures and techniques have not been shown in detail to avoid unnecessarily obscuring the present invention.

When a biometric engine performs an authentication, the engine typically creates a confidence score expressing the likelihood that the user seeking authentication is, in fact, who he or she claims to be. The security application utilizing the biometric engine takes the confidence score and, based on internal decision making logic, determines if the confidence score represents an accept or reject condition. For example, if the biometric engine determines that a caller is authentic with a 75% confidence score, and the security application utilizing the engine requires that incoming calls have a confidence score of 80% or higher to be accepted, the security application will determine that the caller should be rejected.

When a valid user cannot successfully authenticate themselves to the system, this is called a "False Reject." The rate at which False Rejects occur is called the False Reject Rate ("FRR"). When an impostor authenticates themselves to the system, this is called a "False Accept." The rate at which False Accepts occur is called the False Accept Rate ("FAR"). The FAR and FRR of an authentication system can be adjusted by a number of methods, but most typically by adjusting the required confidence score. Adjusting the confidence score downwards increases the rate of False Accepts but reduces the rate of False Rejects. Conversely, adjusting the confidence score upwards increases the rate of False Rejects but reduces the rate of False Accepts. When a security application is tuned so that the number of False Accepts equals the number of False Rejects, this is called the point of Equal Error, or the Equal Error Rate ("EER").

Biometric engines use different encoding techniques and algorithms to create templates, as well as different methods for comparing templates and comparing utterances to templates. Accordingly, even if two engines have a similar EER, the utterances which occasioned the False Accepts and False Rejects are likely to have been different. For example, with a sample set of 100 users, if two engines have an EER of 1%, each engine would falsely accept a single user and falsely reject a single user. Because the algorithms used by each engine are different, however, it is likely that each engine would falsely accept or reject different users.

External factors can impact a biometric engine's performance. For example, factors such as the network used to collect the utterance (e.g., mobile network, PCS network, digital landline, analog landline, VoIP, etc.), the device used to collect the utterance (e.g., handset, headset, external microphone, PC "pinhole" microphone, etc.) and external "background noise" of various types can dramatically impact a biometric engine's performance. Taken together, these external factors are called "operation characteristics" ("OC"). Different biometric engines perform better under specific OC than others.

Biometric engines behave differently based on the operation characteristics ("OC") of a specific transaction. Accordingly, user verification can be subject to higher error rates when the OC of a biometric user enrollment session differs from the OC of a subsequent biometric user verification (e.g., a user who enrolled on an analog landline connection may experience a higher rate of False Rejects when attempting to authenticate from a CDMA mobile phone).

As it applies to user verification, the major contributors to the OC are (i) the channel (e.g., analog landline, digital landline, Voice over IP, CDMA, GSM, TDMA), (ii) the device (e.g., corded handset, cordless handset, corded headset, cordless headset), (iii) the microphone characteristics (e.g., size, impedance, etc.), (iv) the background noise and (v) the codec used for packetizing (e.g., in digital devices such as a mobile phone, Voice over IP phone).

For the purpose of processing, certain factors become more important to the behavior of an engine, such as channel, device and background noise. According to one aspect of the present invention, the channel and background noise can be represented by the channel descriptor "channel.channeltype-.noise.carrier.country.locality.identifier." The terms of this channel descriptor are described as follows. "Channel" defines the descriptor as containing information based on a channel "Channeltype" describes the channel type, which can be GSM, CDMA, TDMA, PHS (Japan), SIP (Voice over IP), H323 (H.323 protocol), ANALOG, ISDN, or the like. "Noise" describes the detected noise level on the channel, if any, otherwise noise=na. "Carrier" describes the carrier name (e.g., Verizon, AT&T, Deutsche Telekom). "Country" describes the country listed in 2 character ISO code (e.g., USA=US, Germany=DE, China=CN). "Locality" describes the known locality of where the call was made, which is represented as the local postal code. "Identifier" represents any specific identifier that might be available, such as a cell tower number, trunk ID or other information that can pinpoint the location of the caller at the time the call was placed.

For example, if a caller is on a GSM mobile phone, the descriptor would be represented as: "channel.GSM." If the noise level of the call is also known, 20 dB for example, this would be represented as: "channel.GSM.20 db." A complete record, from a GSM caller on the Cingular network in San Francisco, Calif., USA (zip code 94107) with no detected background noise from an unknown cell tower would look like: "channel.GSM.na.Cingular.US.94107." A complete record from an ISDN landline caller in Germany on the Deutsche Telekom network from Munich, Germany (postal code 80797) from phone number 089/1239 146 99 with 10 dB of background noise would look like: "channel.ISDN.10dB.DeutscheTelekom.DE.80797.0891239146."

According to one aspect of the present invention, the device information used when making an utterance (for enrollment or verification) can similarly be tracked using the following device descriptor: "device.devicetype.manufacturer.model.settype.misc." The terms of the descriptor are described as follows. "Device" defines the descriptor as containing information based on a device. "Devicetype" describes the type of device used to place the call (e.g., mobile, fixed landline, cordless landline). "Manufacturer" describes the manufacturer of the device (e.g., Nokia, Southwestbell, Motorola). "Model" describes the manufacturer's model information. "Settype" describes the type of set used (e.g., handset, corded headset, wireless headset). "Misc" contains any identifying information from the set type.

For example, the device descriptor for an Avaya 2310 corded landline phone with no headset would look like "device.fixed.Avaya.2310.handset." Likewise, the device descriptor for a Nokia 6610 mobile phone with a jabra330 Bluetooth headset would look like: "device.mobile.Nokia.6610.wirelessheadset.jabra330."

According to one embodiment of the present invention, the system is pre-populated by having a minimum of 200 users enroll. In this exemplary embodiment, each user is provided with a unique userID and enrolls three utterances: (1) a short digit string (e.g., 1234), designated by the term "digits;" (2) a single word (e.g., "hello"), designated by the term "word;" and (3) a short phrase (e.g., "now is the winter of our discontent") designated by the term "phrase." If the user enrolled using his or her voice, the type is defined as "spoken," if the enrollment was simulated through any type of filter or codec (as discussed in greater detail below), a type of "simulated" is assigned.

According to one aspect, each utterance is represented with the utterance descriptor: "utterance.userID.term.type." For example, the recording of "now is the winter of our discontent" by userID 19984 would be listed as: "utterance.19984.phrase.spoken." Each term is recorded at least two times. Each term is recorded, at a minimum, on a standard, landline, corded handset telephone. A spoken utterance is traditionally an industry standard audio file (e.g., WAV), encoded in 8 bit, 8 kHz PCM linear audio, but may be in any format understood by the biometric engine.

Following pre-population, a table is built that includes for each enrolled utterance.term, the following information: (i) timestamp, (ii) channel.channeltype, (iii) channel.noise, (iv) channel.carrier, (v) channel.country, (vi) channel.locality, (vii) channel.identifier, (viii) utterance.userID, (ix) utterance.term, (x) utterance.type, (xi) device.devicetype, (xii) device.manufacturer, (xiii) device.model, (xiv) device.settype, (xv) device.misc and (xvi) the spoken utterance as a 8 kHz, PCM 8 bit Mono RIFF WAV file. Table 1, below, illustrates an example of one such table for a particular utterance.term:

TABLE 1

| Timestamp | Channel.channeltype | Channel.noise | Channel.carrier | Channel.country | Channel.locality | Channel.identifier | Utterance.userID |
|---|---|---|---|---|---|---|---|
| 10/6/06 23.02.44 | Analog | 10 dB | Verizon | US | 10020 | | 93313 |

| Timestamp | Utterance.term | Utterance.type | Device.devicetype | Device.manufacturer | Device.model | Device.settype | Device.misc | Utterance |
|---|---|---|---|---|---|---|---|---|
| 10/6/06 23.02.44 | phrase | spoken | fixed | avaya | 2311 | Na | | Data blob |

According to one aspect of the present invention, after receiving an enrolled utterance.term with the utterance.type of "spoken" and a channel.channeltype of "analog," the system will, via a commercially-available channel simulator filter or codec, create a version of the spoken utterance with a channel.channeltype of GSM, CDMA and/or TDMA. Alternatively, if the channel.channeltype of the utterance is ISDN, then a simulation of Analog is also performed. An exemplary resultant table is illustrated by Table 2, below:

engine testing. The dataset is named set.channeltype.devicetype.settype.term (e.g., set.analog.fixed.na.phrase).

According to one aspect of the present invention, biometric engine testing begins with a "same-channel test" (e.g., comparing GSM-GSM, CDMA-CDMA, TDMA-TDMA, Analog-Analog, etc.). For example, in a dataset having 50 different userIDs, each of which is associated with three utterances (all saying the same phrase), each utterance will be compared to every other utterance in the test set. The utterance being

TABLE 2

| Timestamp | Channel.channeltype | Channel.noise | Channel.carrier | Channel.country | Channel.locality | Channel.identifier | Utterance.userID |
|---|---|---|---|---|---|---|---|
| 10/6/06 23.02.44 | Analog | 10 dB | Verizon | US | 10020 | | 93313 |
| 10/6/06 23.02.44 | GSM | 10 dB | | | | | 93313 |
| 10/6/06 23.02.44 | CDMA | 10 dB | | | | | 93313 |
| 10/6/06 23.02.44 | TDMA | 10 dB | | | | | 93313 |

| Timestamp | Utterance.term | Utterance.type | Device.devicetype | Device.manufacturer | Device.model | Device.settype | Device.misc | Utterance |
|---|---|---|---|---|---|---|---|---|
| 10/6/06 23.02.44 | phrase | spoken | fixed | avaya | 2311 | Na | | Data blob |
| 10/6/06 23.02.44 | phrase | simulated | mobile | | | Na | | Data blob |
| 10/6/06 23.02.44 | phrase | simulated | mobile | | | Na | | Data blob |
| 10/6/06 23.02.44 | phrase | simulated | mobile | | | Na | | Data blob |

If the user subsequently makes further spoken enrollments from other devices or channels, the spoken enrollment will overwrite the corresponding simulated enrollment. For example, when a user who originally enrolled with an analog phone, subsequently enrolls with a GSM phone, the spoken enrollment made with the GSM phone will overwrite the simulated GSM enrollment, as is illustrated in Table 3, below:

tested against is called the "control," and the utterance being used for the challenge is called the "challenge." A table is built with the following results from the testing: the control userID, the challenge userID, and the Engine Response to the comparison. According to one aspect, if the biometric engine is capable of providing a confidence score when comparing two utterances, the Engine Response is expressed as the confi-

TABLE 3

| Timestamp | Channel.channeltype | Channel.noise | Channel.carrier | Channel.country | Channel.locality | Channel.identifier | Utterance.userID |
|---|---|---|---|---|---|---|---|
| 10/6/06 23.02.44 | Analog | 10 dB | Verizon | US | 10020 | | 93313 |
| 11/9/06 12.03.44 | GSM | na | Cingular | US | 10020 | 82910 | 93313 |
| 10/6/06 23.02.44 | CDMA | 10 dB | | | | | 93313 |
| 10/6/06 23.02.44 | TDMA | 10 dB | | | | | 93313 |

| Timestamp | Utterance.term | Utterance.type | Device.devicetype | Device.manufacturer | Device.model | Device.settype | Device.misc | Utterance |
|---|---|---|---|---|---|---|---|---|
| 10/6/06 23.02.44 | phrase | spoken | fixed | avaya | 2311 | Na | | Data blob |
| 11/9/06 12.03.44 | phrase | spoken | mobile | nokia | 6011 | Na | | Data blob |
| 10/6/06 23.02.44 | phrase | simulated | mobile | | | Na | | Data blob |
| 10/6/06 23.02.44 | phrase | simulated | mobile | | | Na | | Data blob |

According to one exemplary embodiment of the present invention, once a minimum of 144 utterances are available (either through simulation or spoken capture) where the channel.channeltype, device.devicetype, device.settype and utterance.term are the same, a dataset is prepped for biometric dence score. According to another aspect, if the biometric engine provides only pass/fail information based upon the comparison, then the Engine Response will be 1 for pass, 0 for fail.

According to one aspect, in which the biometric engine provides a confidence score as an Engine Response, the testing results table is analyzed using the following method. First, the difference between the minimum Engine Response in the results table and the maximum Engine Response in the results table is calculated. That value is then divided by the number of desired intermediate steps (e.g., divide by 20 to provide 20 intermediate testing points). This value (i.e., the difference/20) is called the step. Next, a threshold value equal to the minimum Engine Response is set. An iteration is run in which each data point in the results table is analyzed using this threshold: if the Engine Response for a data point is below the threshold and the control userID is equal to the challenge userID, this is counted as a False Reject (e.g., if the confidence score of the biometric engine for a particular comparison was 40, and the threshold value was set to 50, and the control userID was the same as the challenge userID, then the biometric engine was less confident than the threshold required it to be, despite the fact that the control userID and the challenge userID were the same—a False Reject). If however, the Engine Response is equal to or above the threshold and the control userID is not the same as the challenge userID, this is counted as a False Accept. After performing this comparison against the threshold for every data point in the table, the False Accept Rate ("FAR") and False Reject Rate ("FRR") are calculated for this particular threshold (i.e., false accepts/total comparisons; false rejects/total comparisons).

Then, the threshold value is incremented by the step value (i.e., new threshold value=old threshold value+step) and the analysis is rerun, and FAR and FRR rates are calculated for the new threshold value. After the same analysis has run for every threshold value from the minimum to the maximum, the results for all of the analyses are stored in a table, such as Table 4, below:

TABLE 4 min Engine Response = 30
max Engine Response = 70

| Threshold | FAR | FRR |
|---|---|---|
| 30 | .04 | .001 |
| 32 | .037 | .002 |
| 34 | .031 | .004 |
| 30 | .030 | .008 |
| 38 | .028 | .012 |
| 40 | .023 | .017 |
| 42 | .020 | .02 |
| 44 | .017 | .023 |
| 46 | .015 | .027 |
| 48 | .012 | .029 |
| 50 | .01 | .031 |
| 52 | .008 | .037 |
| 54 | .003 | .041 |
| 56 | .001 | .045 |
| 58 | .0007 | .06 |
| 60 | .0003 | .08 |
| 62 | .0002 | .083 |
| 64 | .0001 | .085 |
| 66 | .00004 | .087 |
| 68 | .00003 | .092 |
| 70 | .00001 | .10 |

This table can also be expressed graphically with two intersecting lines, where the X-axis is a False Accept Rate or False Reject Rate and the Y-axis is the threshold setting. Where the two lines intersect is the Equal Error Rate for this particular same-channel test (e.g., for an Analog-Analog same channel test, the ERR may be at a threshold level of about 87%).

According to an additional aspect of the present invention, for a biometric engine which allows a sensitivity level to be set, minimum and maximum sensitivity levels are determined, and intermediate values between the minimum and maximum levels are generated. For example, with a biometric engine having a minimum sensitivity setting of 1.0 and a maximum sensitivity setting of 5.0, the system will generate a median setting (3.0), a point between the median and minimum (2.0), and a point between the median and maximum (4.0). The above-described analysis on the testing results table is then run for each of the various sensitivity settings, resulting in a three-dimensional chart where the Z-axis represents the sensitivity setting.

Alternatively, for a biometric engine which provides only pass/fail information (in lieu of a confidence score), the sensitivity information described above may be used to provide the Y axis of a two-dimensional chart of sensitivity over FAR/FRR, rather than the two-dimensional threshold value over FAR/FRR described above.

Biometric engine testing continues with cross-channel testing (e.g., comparing Analog-GSM, Analog-CDMA, Analog-TDMA, GSM-CDMA, GSM-TDMA, CDMA-TDMA, etc.) similar to the same-channel testing described in greater detail above. A similar analysis is run on the testing results table for each of these cross-channel tests.

The results from all of these analyses (i.e., same-channel and cross-channel) can be used to determine an appropriate threshold level and/or sensitivity level for a given set of operation characteristics (e.g., for a user who enrolled with an analog landline and seeks to authenticate with a GSM mobile phone, the Analog-GSM analysis results indicate that a threshold level of 73 provides the ERR for this comparison).

Figure 1:
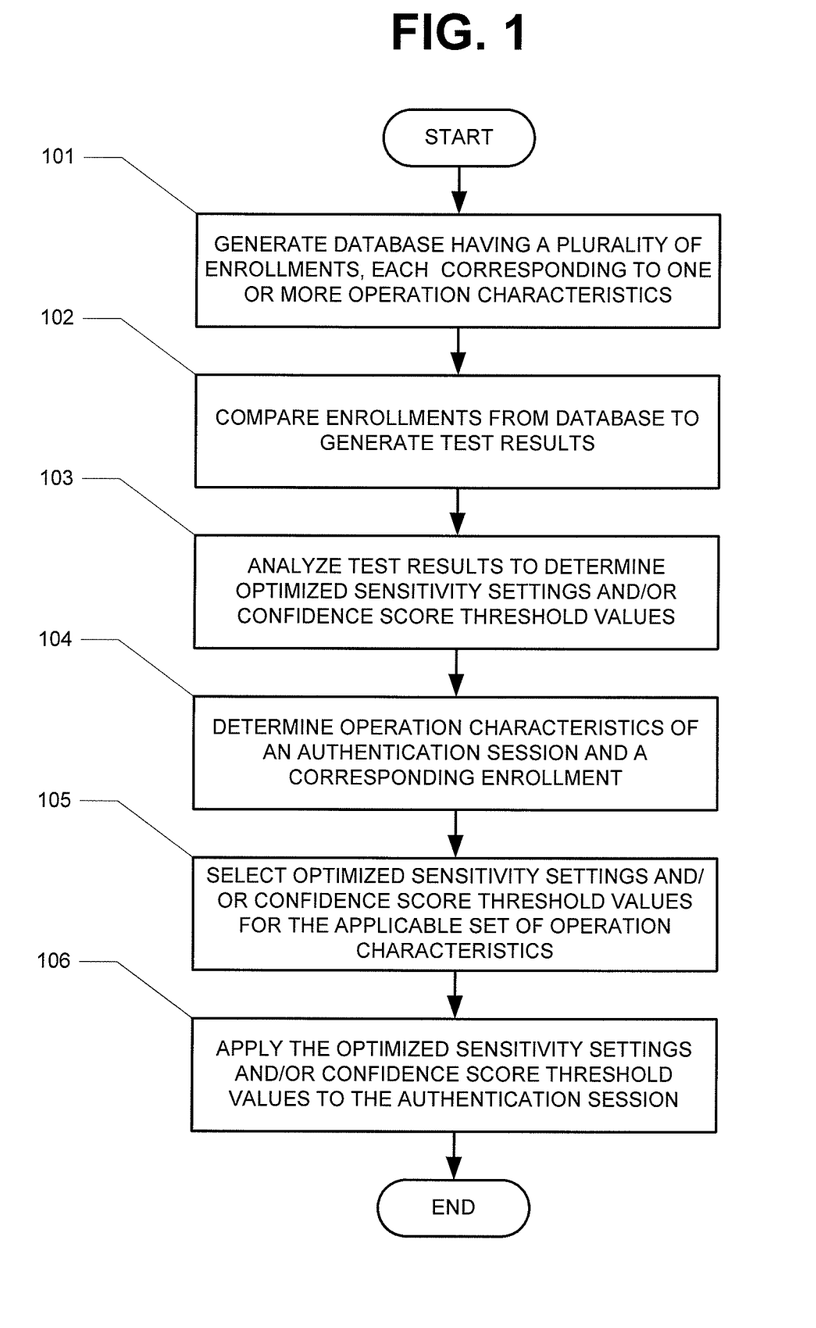
FIG. 1 is a flow chart illustrating a method for adaptively tuning a biometric engine in accordance with one embodiment of the present invention.

FIG. 1 is a flow chart illustrating a method for adaptively tuning a biometric engine in accordance with one embodiment of the present invention. The method begins with step 101, in which a database of enrollments is generated. As set forth in greater detail above, each enrollment corresponds to one or more of a plurality of operation characteristics. Each enrollment may further be an actual enrollment, or a simulated enrollment based upon an actual enrollment. The method continues in step 102, in which the biometric engine compares enrollments from the database to generate test results. The test results include, for each set of operation characteristics, error rates for a plurality of sensitivity settings and/or confidence score threshold values, as set forth in greater detail above with reference to Table 4. The method continues in step 103, in which the test results are analyzed to determine optimized sensitivity settings and/or confidence score threshold values for each set of operation characteristics. According to one aspect of the present invention, the optimized settings for a set of operation characteristics are the settings that provide approximately equal FAR and FRR.

The method continues in step 104, in which the operation characteristics of an authentication session and a corresponding enrollment are determined. This determination provides the appropriate set of operation characteristics for the security application to use. In step 105, the optimized sensitivity settings and/or confidence score threshold values for the applicable set of operation characteristics determined in step 103 are selected. In step 106, these optimized sensitivity settings and/or confidence score threshold values are applied to the authentication session.

According to one aspect of the present invention, when a biometric security application wants to use this adaptive method for tuning a biometric engine, it can extract from the analyses an appropriate threshold level for a confidence score to use in authentication. For example, according to one aspect of the present invention, a security application has been developed with FAR and FRR thresholds (e.g., FAR cannot exceed 0.01%, FRR cannot exceed 2%). A configuration utility determines from the analysis test results described above what the appropriate threshold settings should be for each of the following operating characteristics: Analog-GSM, Analog-CDMA, Analog-TDMA, GSM-CDMA, GSM-TDMA, CDMA-TDMA, GSM-GSM, CDMA-CDMA, TDMA-TDMA and Analog-Analog.

At the time of each call, the security application, using any available method, determines the OC when a telephone call comes in. For example, to determine the OC of the incoming call, the application may use (1) a database of phone numbers, (e.g., phone number xxx is a PCS mobile phone, phone number xxx is an analog landline, etc.), (2) info digits passed with call setup, (3) line or utterance analyzers to determine (or assume) what type of device and network is being used or (4) a user description of the type of network and device that are being used.

Based on the determination of the OC for the call, the threshold (and sensitivity, if applicable) can be adjusted to achieve the desired FAR/FRR characteristics specified by the platform. For example, if the OC for an incoming call is determined to be a landline phone, and a landline template has previously been loaded (i.e., the user enrolled using a landline phone), a security application which has been configured to require a FAR not in excess of 0.01% and a FRR not in excess of 2% will evaluate the analysis results for the Analog-Analog test and determine that a confidence score of 87% provides the maximum allowed FAR (0.01%) at the best possible FRR (1%), based on the OC modeling provided. Accordingly, the security application will select 87% for the security threshold to use in authenticating the user placing the incoming call.

According to one aspect, during setup, the platform will take the available OC testing (for each engine if there are multiple engines) and provide a list of conditions where the requested FAR and FRR cannot be achieved. For example, in a platform set for FAR not to exceed 0.01% and FRR not to exceed 2%, if a call comes in on a GSM mobile phone and the only template available was made using a Analog connection, the platform may not be able to meet the FRR target (i.e., if the platform determines from the analysis results that to obtain a FAR of 0.01% for Analog-GSM, the FRR will be 4%). In such a situation, the platform may be configured by a platform administrator to (1) allow the higher FRR and proceed, (2) reject the call and ask the caller to call in from an appropriate device, or (3) perform any other action set by the administrator.

Figure 2:
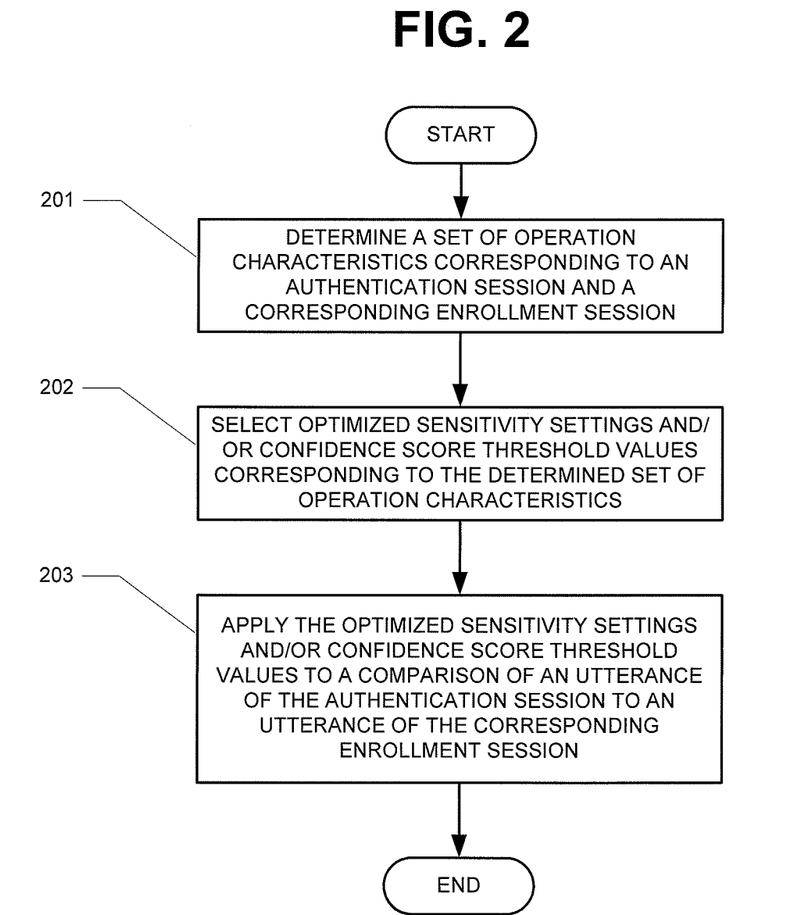
FIG. 2 is a flow chart illustrating a method for biometric authentication in accordance with one embodiment of the present invention.

FIG. 2 is a flow chart illustrating a method for biometric authentication in accordance with one embodiment of the present invention. The method begins in step 201, in which a set of operation characteristics corresponding to an authentication session and a corresponding enrollment session are determined. In step 202, optimized sensitivity settings and/or confidence score threshold values corresponding to the determined set of operation characteristics are selected from a database of sensitivity settings and/or confidence score threshold values. According to one aspect of the present invention, the optimized settings for a set of operation characteristics are the settings that provide approximately equal FAR and FRR. In step 203, the optimized sensitivity settings and/or confidence score threshold values are applied to a comparison of an utterance of the authentication session to an utterance of the corresponding enrollment session.

While the present exemplary embodiments have been described with reference to sets of operation characteristics relating to the channel type of enrollment and authentication transactions, it will be apparent to one of ordinary skill in the art that the present invention is not limited to such an arrangement. Rather, any of a number of operation characteristics may be used to generate test results and analysis data for biometric engine tuning. For example, optimized sensitivity settings and/or confidence score threshold values may be calculated for one or more of the following: noise levels, carriers, countries, localities, device types, manufacturers, or the like. By way of example, biometric engine testing may be done to determine the optimized settings for a relationship between utterances recorded from the US with 10 dB of noise and utterances from China with 23 dB of noise, or a relationship between utterances from Motorola® brand phones using Bluetooth headsets and Avaya brand phones using speakerphones, or the like.

Figure 3:
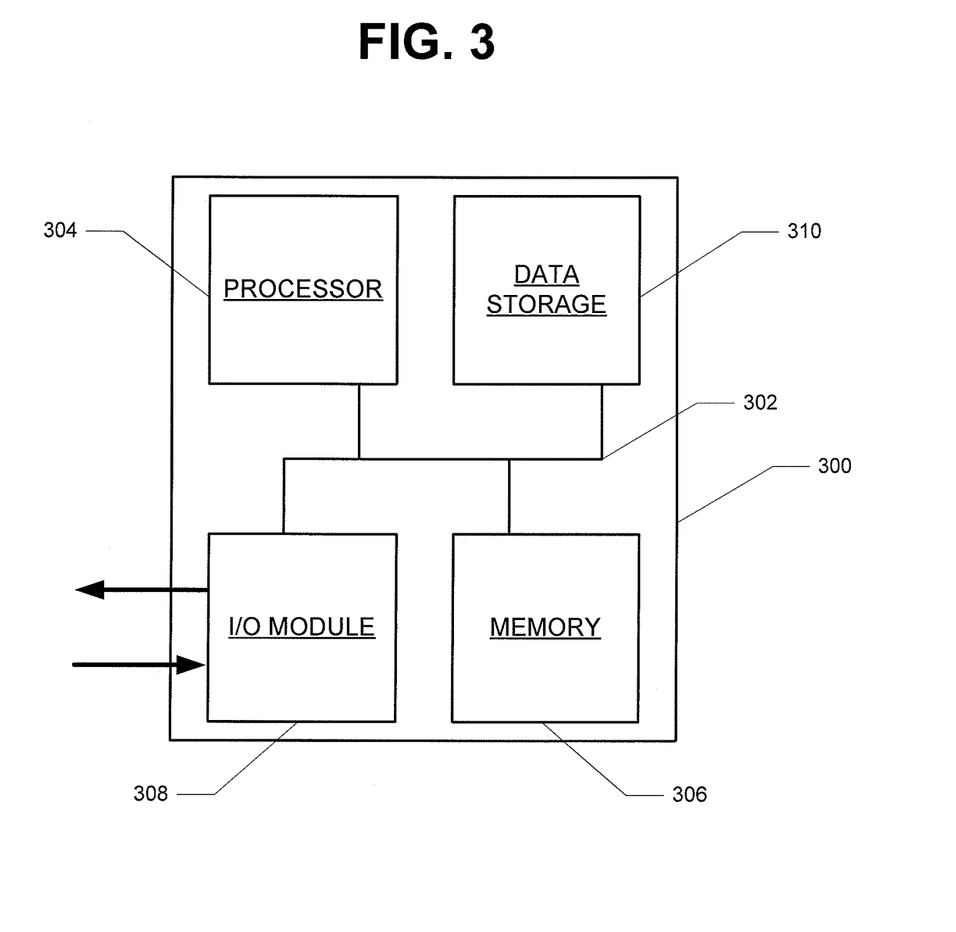
FIG. 3 is a block diagram that illustrates a computer system upon which an embodiment of the present invention may be implemented.

FIG. 3 is a block diagram that illustrates a computer system 300 upon which an embodiment of the present invention may be implemented. Computer system 300 includes a bus 302 or other communication mechanism for communicating information, and a processor 304 coupled with bus 302 for processing information. Computer system 300 also includes a memory 306, such as a random access memory ("RAM") or other dynamic storage device, coupled to bus 302 for storing information and instructions to be executed by processor 304. Memory 306 may also be used for storing temporary variable or other intermediate information during execution of instructions to be executed by processor 304. Computer system 300 further includes a data storage device 310, such as a magnetic disk or optical disk, coupled to bus 302 for storing information and instructions.

Computer system 300 may be coupled via I/O module 308 to a display device (not illustrated), such as a cathode ray tube ("CRT") or liquid crystal display ("LCD") for displaying information to a computer user. An input device, such as, for example, a keyboard or a mouse may also be coupled to computer system 300 via I/O module 308 for communicating information and command selections to processor 304.

According to one embodiment of the invention, adaptively tuning a biometric engine and/or biometric authentication may be performed by a computer system 300 in response to processor 304 executing one or more sequences of one or more instructions contained in memory 306. Such instructions may be read into memory 306 from another machine-readable medium, such as data storage device 310. Execution of the sequences of instructions contained in main memory 306 causes processor 304 to perform the process steps described herein. One or more processors in a multi-processing arrangement may also be employed to execute the sequences of instructions contained in memory 306. In alternative embodiments, hard-wired circuitry may be used in place of or in combination with software instructions to implement the invention. Thus, embodiments of the invention are not limited to any specific combination of hardware circuitry and software.

The term "machine-readable medium" as used herein refers to any medium that participates in providing instructions to processor 304 for execution. Such a medium may take many forms, including, but not limited to, non-volatile media, volatile media, and transmission media. Non-volatile media include, for example, optical or magnetic disks, such as data storage device 310. Volatile media include dynamic memory, such as memory 306. Transmission media include coaxial cables, copper wire, and fiber optics, including the wires that comprise bus 302. Transmission media can also take the form of acoustic or light waves, such as those generated during radio frequency and infrared data communications. Common forms of machine-readable media include, for example, floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH EPROM, any other memory chip or cartridge, a carrier wave, or any other medium from which a computer can read.

While the present invention has been particularly described with reference to the various figures and embodiments, it should be understood that these are for illustration purposes only and should not be taken as limiting the scope of the invention. There may be many other ways to implement the invention. Many changes and modifications may be made to the invention, by one having ordinary skill in the art, without departing from the spirit and scope of the invention.

What is claimed is:

1. A method for adaptively tuning a voice biometric engine, comprising the steps of:
   generating a database having a plurality of actual voice biometric user enrollments and a plurality of simulated voice biometric user enrollments each derived from an actual voice biometric enrollment by passing audio associated with an actual voice biometric enrollment by a human user through a plurality of audio filters to distort the audio and thereby simulate an enrollment from another person,
   each actual or simulated voice biometric enrollment comprising data elements specifying a plurality of operation characteristics,
   the plurality of operation characteristics comprising at least a channel type;
   comparing, with the biometric engine, said plurality of actual voice biometric user enrollments from the database with said plurality of simulated voice biometric user enrollments from the database to generate test results including, for each of a plurality of sets of operation characteristics,
      false accept rates obtained when a user of at least one of said plurality of actual voice biometric user enrollments is wrongly considered the same as a user of at least one of said plurality of simulated voice biometric user enrollments and
      false reject rates obtained when a user of at least one of said plurality of actual voice biometric user enrollments is wrongly considered different than a user of at least one of said plurality of simulated voice biometric user enrollments and
   determining, using analysis of the test results, at least an optimized confidence score threshold value[s] for each set of operation characteristics,
   wherein the optimized confidence score threshold value is determined by achieving a false accept error rate and false reject error rate that are substantially equal to each other based on said false accept rates and false reject rates.

2. The method of claim 1, wherein the operation characteristics comprise one or more of channel information, device information, microphone information, carrier information, noise level, caller location and packetizing codec used.

3. The method of claim 1, further comprising the steps of:
   determining one or more operation characteristics of an authentication session and a corresponding enrollment to determine an applicable set of operation characteristics;
   selecting an optimized confidence score threshold values for the applicable set of operation characteristics; and
   applying the selected optimized confidence score threshold values to the authentication session.

4. The method of claim 3, wherein the operation characteristics of the authentication session are determined from one or more of: a database of phone numbers, info digits passed with call setup, line and/or utterance analyzers and a user description.

5. Machine-readable non-transitory medium comprising one or more sequences of instructions for adaptively tuning a biometric engine, wherein execution of the one or more sequences of instructions by one or more processors causes the one or more processors to perform the steps of:
   generating a database having a plurality of actual voice biometric user enrollments and a plurality of simulated voice biometric user enrollments each derived from an actual voice biometric enrollment by passing audio associated with an actual voice biometric enrollment by a human user through a plurality of audio filters to distort the audio and thereby simulate an enrollment from another person,
   each actual or simulated voice biometric enrollment comprising data elements specifying a plurality of operation characteristics,
   the plurality of operation characteristics comprising at least a channel type;
   comparing, with the biometric engine, said plurality of actual voice biometric user enrollments from the database with said plurality of simulated voice biometric user enrollments from the database to generate test results including, for each of a plurality of sets of operation characteristics,
   false accept rates obtained when a user of at least one of said plurality of actual voice biometric user enrollments is wrongly considered the same as a user of at least one of said plurality of simulated voice biometric user enrollments and
   false reject rates obtained when a user of at least one of said plurality of actual voice biometric user enrollments is wrongly considered different than a user of at least one of said plurality of simulated voice biometric user enrollments; and
   determining, using analysis of the test results, at least an optimized confidence score threshold value for each set of operation characteristics,
   wherein the optimized confidence score threshold value is determined by achieving a false accept error rate and false reject error rate that are substantially equal to each other based on said false accept rates and said false reject rates.

6. The machine-readable physical data storage medium of claim 5, wherein the operation characteristics comprise one or more of channel information, device information, microphone information, carrier information, noise level, caller location and packetizing codec used.

7. The machine-readable physical data storage medium of claim 5, wherein execution of the one or more sequences of instructions by the one or more processors causes the one or more processors to further perform the steps of:
   determining one or more operation characteristics of an authentication session and a corresponding enrollment to determine an applicable set of operation characteristics;
   selecting an optimized confidence score threshold values for the applicable set of operation characteristics; and
   applying the selected optimized confidence score threshold values to the authentication session.

* * * * *